United States Patent [19]
Larsen et al.

[11] Patent Number: 5,122,333
[45] Date of Patent: Jun. 16, 1992

[54] APPARATUS FOR ELIMINATING AEROSOLS FROM AIR FROM AN ESCAPING NUCLEAR REACTOR CONTAINMENT VESSEL

[75] Inventors: Niels Larsen, Seuzach; Peter Mathys, Neuhausen, both of Switzerland

[73] Assignee: Sulzer Brothers Limited, Winterthur, Switzerland

[21] Appl. No.: 533,298

[22] Filed: Jun. 5, 1990

[30] Foreign Application Priority Data

Jun. 14, 1989 [CH] Switzerland .................. 02218/89-6

[51] Int. Cl.⁵ ............................................ G21C 15/18
[52] U.S. Cl. .................................. 376/309; 376/283; 376/293
[58] Field of Search ............... 376/309, 310, 316, 283, 376/282, 293

[56] References Cited

U.S. PATENT DOCUMENTS

| | | | |
|---|---|---|---|
| 4,859,405 | 8/1989 | Squarer et al. | 376/309 |
| 4,873,050 | 10/1989 | Eckardt | 376/283 |
| 4,909,982 | 3/1990 | Ezekoye | 376/310 |

FOREIGN PATENT DOCUMENTS 1111490  5/1986  Japan .................. 376/283

Primary Examiner—Brooks H. Hunt
Assistant Examiner—Frederick H. Voss
Attorney, Agent, or Firm—Kenyon & Kenyon

[57] ABSTRACT

The apparatus comprises a conduit connected to a containment vessel to supply air to a water bath contained in a basin. The conduit is connected to a plurality of air nozzles in the water bath, each of which forms a unit together with a perforate baffle plate disposed above the nozzle to intensively mix the emerging air with water. A set of static mixer elements enclosed by a jacket is disposed in the water bath above the baffle plate.

7 Claims, 3 Drawing Sheets

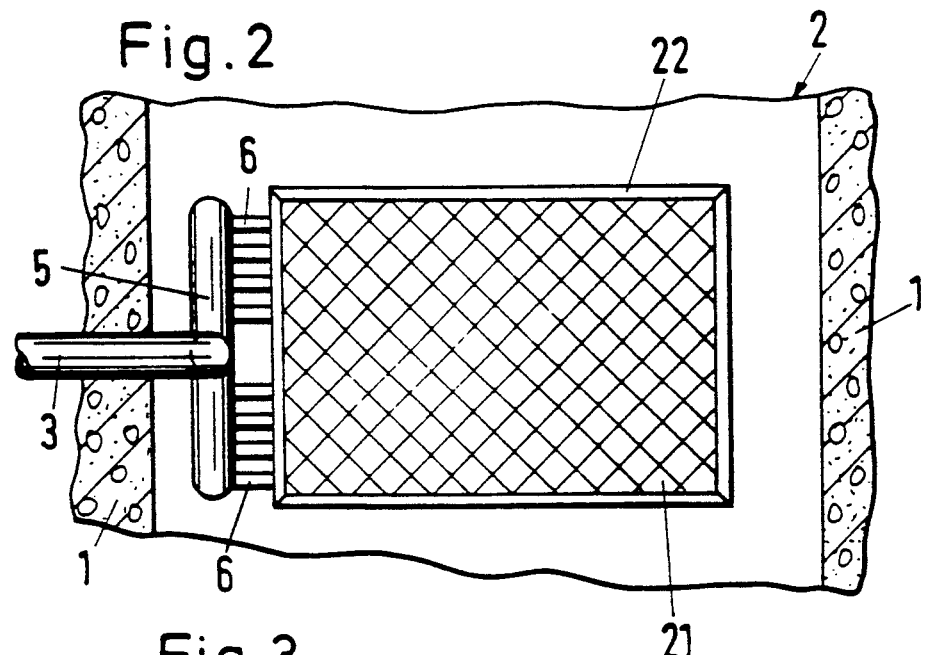
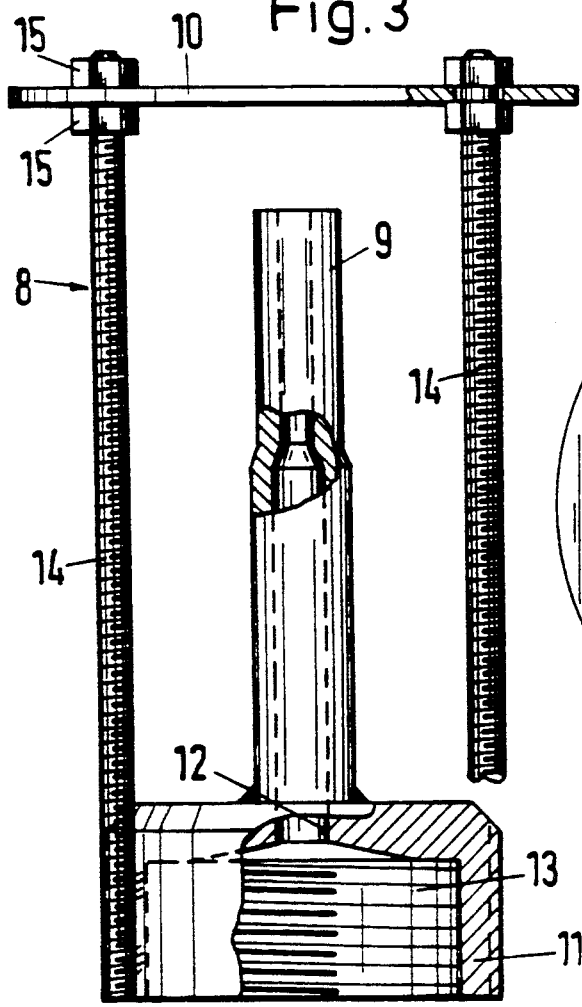
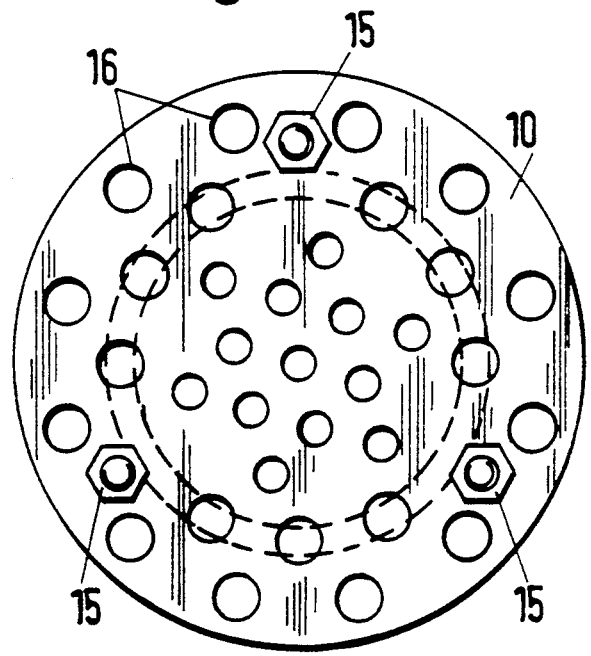

APPARATUS FOR ELIMINATING AEROSOLS FROM AIR FROM AN ESCAPING NUCLEAR REACTOR CONTAINMENT VESSEL

This invention relates to an apparatus for eliminating aerosols from air escaping from a nuclear reactor containment vessel.

As is known, various types of apparatus have been used for the elimination of aerosols contained in air which has escaped from the containment vessel of a nuclear reactor plant, for example, in the event of an excess pressure occurring in the containment vessel. In such apparatus, the air is usually ID feed to a water bath by means of a conduit connected to the containment vessel. In one known apparatus of this kind, venturi scrubbers have been disposed in a water bath with each having a venturi tube to which the aerosol-laden air is feed while water is added to the air flowing through each venturi tube at the narrowest point of such tube. The purpose of such scrubbers is to fix a considerable proportion of the aerosols in the water by mixing the water and air. In addition, above the water bath in a tank containing the same, there is disposed a filter of high-grade steel fibers, through which the air emerging from the water bath has to pass before being discharged to atmosphere via a chimney. The purpose of this filter is to retain the residual aerosols in the air.

In the known apparatus, separate containers are required to accommodate the water bath and the filter. Further, the extremely fine high-quality steel fibers of the filter have a thickness of 2 μm and require special protective steps to guard against corrosion. After any trial runs of the apparatus, each of the filters normally has to be replaced. In addition, the filter retention power is restricted. Further, the venturi scrubbers disposed vertically in the water bath take up a relatively considerable height. The constructional requirements and overall volume of the known apparatus are therefore quite large.

Accordingly, it is an object in the invention to reduce the expense of removing aerosols from air vented from a nuclear reactor containment vessel.

It is another object of the invention to reduce the constructional outlay for an apparatus for eliminating aerosols from the air of a nuclear reactor containment vessel.

It is another object of the invention to provide a relative simple apparatus for eliminating aerosols from air vented from a nuclear reactor containment vessel.

Briefly, the invention provides an apparatus for eliminating aerosols from air escaping from a nuclear reactor containment vessel. In this respect, the apparatus includes a water basin for holding a bath of water and a conduit for delivering a flow of aerosol-laden air into the water bath from a containment vessel of a nuclear reactor plant, for example, in response to an excess pressure in the containment vessel. In addition, a plurality of nozzles are disposed in the basin and are connected in parallel with the air delivery conduit in order to discharge jets of aerosol-laden air into the water bath for entrainment of water therein. Also, a baffle plate extends over the nozzles and has perforations therein for mixing the water-entrained aerosol-laden air passing therethrough. Still further, a plurality of static mixer elements are disposed in stacked array within the water bath above the baffle plate for conducting the mixture of water-entrained aerosol-laden air therethrough. These static mixer elements have intersecting flow passages for splitting up elongating and re-arranging the components of the water and air mixture in order to disperse the air in the water while separating the aerosols into at least one of the water and the static mixer elements.

The apparatus also includes a jacket which circumferentially surrounds the mixer elements. This jacket may also extend downwardly into a zone of the nozzles.

A further conduit is also connected to the basin above the water bath and the static mixer elements for discharging a flow of aerosol-depleted air therefrom.

The use of a plurality of nozzles with a perforated baffle plate reduces the overall height required of the aerosol-eliminating apparatus considerably as compared with known venturi scrubbers. Hence, the space requirements for the apparatus are reduced.

The use of static mixer elements enables practically all the aerosols to be fixed. Thus, the air emerging from the water bath can be discharged directly to the surroundings, that is, without having to pass through a filter. Also, there is no need to provide a special closed container for the apparatus. The nozzles, baffle plates and static mixer elements can be accommodated in a water basin which, in any case, is present in a nuclear reactor plant.

The apparatus permits trials to be carried out at any time without any need to subsequently replace any parts. Further, the parts of the apparatus can be easily inspected an the static mixer elements can be easily removed, and, if necessary, cleaned by conventional processes.

These and other objects and advantages of the invention will become more apparent from the following detailed description taken in conjuction with the accompanying drawings wherein:

FIG. 1 diagrammatically illustrates a vertical sectional view through a water basin containing an apparatus constructed in accordance with the invention;

FIG. 2 illustrates a horizontal sectional view through a part of the water basin of FIG. 1;

FIG. 3 illustrates a partial sectional and partial elevation view of a nozzle and baffle plate unit according to the invention;

FIG. 4 illustrates a plan view of a baffle plate in accordance with the invention.

Figure 1:
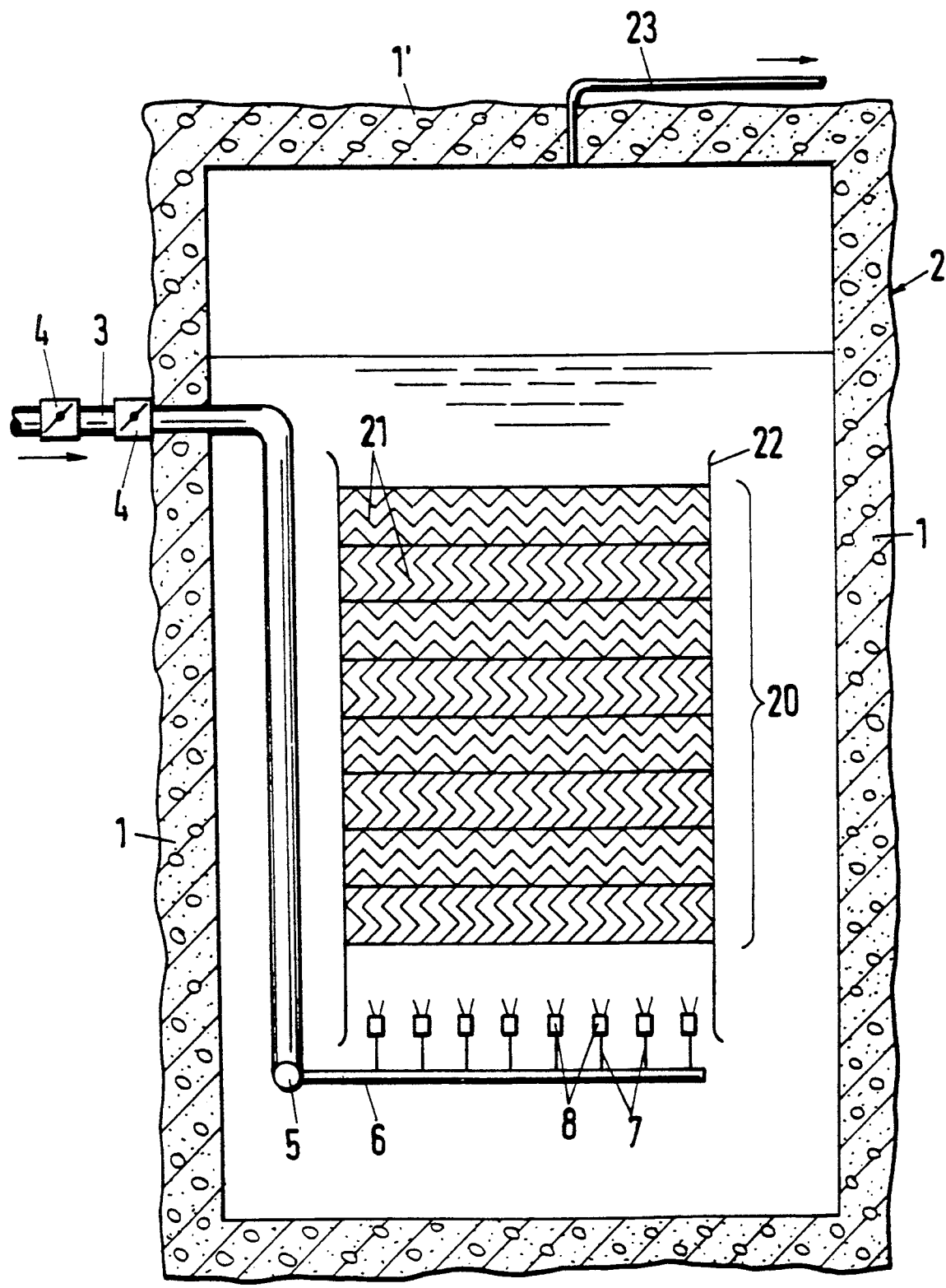

Referring to FIG. 1, a water basin 2 having concrete walls 1 is largely filled with a bath of water and at the same time, acts as a storage basin for fuel elements rods of a nuclear reactor plant (not shown). A conduit 3 passes through one wall 1 of the basin 2 and extends, for example, to the interior of a containment or safety vessel of a nuclear reactor plant (not shown). This conduit 3 contains two containment isolating valves 4 between the containment vessel (not shown) and the basin 2 which open in the event of an excess pressure in the containment vessel.

As illustrated, the conduit 3 extends vertically downwardly into the interior of the basin 2 and leads into a substantially horizontal distributor 5 from which a plurality of horizontal tubes 6 branch. For example, eight tubes as shown in FIG. 2, extend from the distributor 5. Each tube 6 is closed at the distal end, as shown to the right in FIG. 1.

In addition eight vertical tubes 7 branch off from each horizontal tube 6 with each vertical tube 7 extending upwardly to a unit 8 consisting of a vertically disposed nozzle 9 and a baffle plate 10 (see FIG. 3).

In all, there are sixty-four units 8 distributed over a rectangular area and all are disposed at the same height in a horizontal plane.

A set 20 of static mixer elements 21 is provided above the sixty-four units 8 in the basin 2 and these elements 21 are completely submerged in the water filling the basin 2. The static mixer elements 21 are also circumferentially enclosed by a jacket 22, the bottom end of which extends into the zone of the units 8.

A conduit 23 is connected to the top 1' of the basin and leads to a venting chimney (not show) for the discharge of a flow of aerosol-depleted air therefrom.

Referring to FIG. 3, each nozzle 9 of a unit 8 is formed of a vertical tube having a cross-section which tapers conically to some extent substantially in the middle of the tube length. The nozzle tube is also fixed at the bottom end to a cap nut 11, for example, by welding. This cap nut 11 has an opening 12 in line with the nozzle 9 in order to convey aerosol-laden air therethrough. In addition, the cap nut 11 has an internal screw thread 13 by means of which the cap nut can be threaded onto a vertical branch tube 7 which has a corresponding external screw thread.

The baffle plate 10 is fixed on each cap nut 11 by means of three rods 14 which extend from the cap nut 11 in parallel and uniformally over the periphery of the cap nut 11. To this end, the cap nut 11 is provided with three axial recesses at the outer periphery to receive the bottom ends of the rods 14 which are then welded to the cap nut 11.

The rods 14 pass through respective openings in the baffle plate 10 as indicated in FIG. 4 while pairs of nuts 15 are threaded on each rod 14 in order to secure the plate 10 therebetween at a precise location relative to the orifice of the nozzle 9. As indicated in FIG. 4, the baffle plate 10 is provided with a plurality of perforations 16. Any suitable distribution of perforations may be used.

Figure 5:
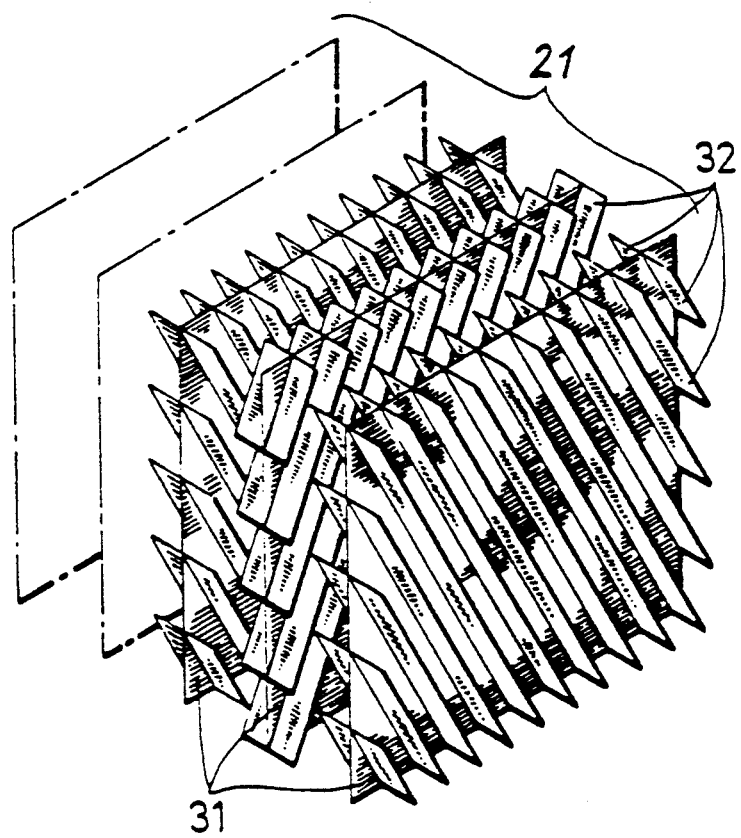
FIG. 5 illustrates a part perspective view of a static mixer element used in an apparatus in accordance with the invention.

Each static mixer element 21 may, in known manner, be constructed of corrugated or fluted laminates, such as metal sheets. For example, referring to FIG. 5, each static mixer element 21 may be formed parallel Vertical sheets 31 having a plurality of parallel guide elements in the form of slats 32 welded to each sheet 31 and extending from opposite sides at a angle to the vertical. As indicated, the slats 32 on one sheet 31 are disposed in criss-crossing relation to the slats 32 connected to an adjacent sheet 31. In this respect, the static mixer elements 21 are built so as to form defined open intersecting flow passages between them. A detailed construction of such a mixer element is described, for example in Swiss patent 547,120.

The apparatus described operates as follows. In the event of an excess pressure occurring in the containment vessel, e.g. due to a melt-down, the isolating valves 4 open. Aerosol-laden air from the containment vessel now flow via the conduit 3, tubes 6, 7 and nozzles 9 into the water bath of the basin 2. The air emerging from the nozzles 9 entrains water from the surroundings and mixes intensively on passage through the holes 16 in the baffle plates 10. The water-air mixture then flows on up and enters the static mixer elements 21. A continuous splitting up, elongation and re-arrangement of the components of the water-air mixture takes place in the intersecting flow passages of these mixer elements 21. The air rising from the nozzles 9 is divided up in each mixing element 21 into a number of sub-flows which cross one another at an angle of about 90°. The mixing elements 21 are so stacked on one another in the set 20 that the vertical sheets 31 of one mixing element include an angle other than zero with those of the adjacent mixing element. In the embodiment of FIG. 1, this angle is, for example, 45°.

In these conditions, the air which entrains the aerosols is dispersed in the water. The aerosols are separated from the air to the water or to the mixer elements. Thus, air from which aerosols have been eliminated leaves the top end of the set 20 and then passes to the discharge chimney via the conduit 23 without having to pass through further filters. The water emerging at the top end of the set 20 circulates downwards outside the jacket 22, for which purpose sufficient space must be left between the walls 1 and the jacket 22. At the bottom end of the jacket 22, the water flows back into the area of the nozzles 9.

Contrary to the embodiment described, instead of the arrangement of one baffle plate 10 to each nozzle 9, it is possible to provide a baffle plate common to all the nozzles or a common baffle plate for specific group of nozzles.

The invention further provides an apparatus for eliminating aerosols from air escaping from a nuclear reactor containment vessel which is greatly reduced for at least a constant degree of purity of air leaving the apparatus relative to previously known apparatus.

The invention further provides an apparatus for eliminating aerosols from air vented from a nuclear reactor pressure containment vessel in a relatively simple manner.

What is claimed is:

1. In combination a water basin for holding a bath of water therein;

a conduit for delivering a flow of aerosol-laden air into said water basin from a containment vessel of a nuclear reactor plant in response to an excess pressure in the containment vessel;

a plurality of vertically disposed nozzles in said basin and connected in parallel with said conduit to discharge jets of aerosol-laden air into said water bath for entrainment of water therein;

a plurality of baffle plates, each baffle plate extending over a respective one of said nozzles in vertically spaced relation to define a unit therewith and having perforations therein for mixing the water-entrained aerosol-laden air passing therethrough;

a plurality of static mixer elements disposed in stacked array within said water bath in spaced relation above said baffle plates for conducting the mixture of water-entrained aerosol-laden air therethrough, said elements having defined intersecting flow passages therein for splitting up, elongating and rearranging the components of said water and air mixture to disperse the air in the water while separating the aerosols into at least one of the water and said mixer elements; and a jacket circumferentially surrounding said mixer elements.

2. The combination as set forth in claim 1 wherein said jacket extends downwardly into a zone of said nozzles.

3. The combination as set forth in claim 1 which further comprises a conduit connected to said basin along said water bath for discharging a flow of aerosol-depleted air therefrom.

4. An air entraining unit comprising
a nozzle for discharging an air jet into a water bath for entraining of water therein, said nozzle including a vertical tube and an internally threaded cap nut secured to said tube, said cap having an opening in line with said tube for conveying air therebetween; and
a baffle plate secured to and disposed above said nozzle, said plate having perforations therein for intensively mixing water-entrained air passing therethrough.

5. An air entraining unit as set forth in claim 4 which further includes a plurality of threaded rods secured to and extending in parallel from said cap for passage through said baffle plate and pairs of nuts threaded on each rod to secure said plate therebetween at a precise location relative to said nozzle.

6. An apparatus for eliminating aerosols from the air of a nuclear reactor containment vessel, said apparatus comprising
a water basin for holding a bath of water therein;
a conduit for delivering a flow of aerosol-laden air into said water basin from a containment vessel of a nuclear reactor plant;
a plurality of vertically disposed nozzles in said basin and connected in parallel with said conduit to discharge jets of aerosol-laden air into said water bath for entrainment of water therein;
a plurality of baffle plates, each baffle plate extending over a respective one of said nozzles in vertically spaced relation to define a unit therewith and having perforations therein for mixing the water-entrained aerosol-laden air passing therethrough; and
at least one static mixer element disposed within said water bath in spaced relation above said baffle plates for conducting the mixture of water-entrained aerosol-laden air therethrough, said element having a plurality of defined intersecting flow passages therein for splitting up, elongating and re-arranging the components of said water and air mixture to disperse the air in the water while separating the aerosols into at least one of the water and aid mixer elements.

7. An apparatus as set forth in claim 6 which further comprises a jacket circumferentially surrounding said static mixer element and said nozzles.

* * * * *

UNITED STATES PATENT AND TRADEMARK OFFICE
CERTIFICATE OF CORRECTION

PATENT NO. : 5,122,333
DATED : June 16, 1992
INVENTOR(S) : Larsen et al.

It is certified that error appears in the above-identified patent and that said Letters Patent is hereby corrected as shown below:

Column 1, line 14, delete "1D";

Column 2, line 31, change "an" to --and--;

Column 3, line 12, change "Which" to --which--;

Column 3, line 14, change "basin" to --basin 2--;

Column 3, line 25, change "nut" to --nut 11--;

Signed and Sealed this

Twenty-fifth Day of January, 1994

Attest:

BRUCE LEHMAN

Attesting Officer

Commissioner of Patents and Trademarks